(12) United States Patent
Zhong

(10) Patent No.: US 10,091,307 B2
(45) Date of Patent: *Oct. 2, 2018

(54) APPLICATION MANAGEMENT METHOD AND TERMINAL

(71) Applicant: Huawei Device (Dongguan) Co., Ltd., Dongguan (CN)

(72) Inventor: Guanghua Zhong, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 25 days.

This patent is subject to a terminal disclaimer.

(21) Appl. No.: 15/340,348

(22) Filed: Nov. 1, 2016

(65) Prior Publication Data

US 2017/0048333 A1 Feb. 16, 2017

Related U.S. Application Data

(63) Continuation of application No. 13/717,859, filed on Dec. 18, 2012, now Pat. No. 9,513,955, which is a
(Continued)

(51) Int. Cl.
*H04L 29/08* (2006.01)
*H04L 29/06* (2006.01)
(Continued)

(52) U.S. Cl.
CPC ............ *H04L 67/145* (2013.01); *G06F 1/329* (2013.01); *G06F 1/3234* (2013.01); *G06F 9/46* (2013.01);
(Continued)

(58) Field of Classification Search
CPC ... H04L 67/145; H04L 67/1095; H04L 69/28; H04L 69/16; G06F 1/3234; G06F 1/329;
(Continued)

(56) References Cited

U.S. PATENT DOCUMENTS

2003/0008690 A1   1/2003   Guterman
2005/0226202 A1*  10/2005  Zhang .................. H04L 47/245
                                                         370/349
(Continued)

FOREIGN PATENT DOCUMENTS

CN         101403981 A     4/2009
CN         101488989 A     7/2009
(Continued)

OTHER PUBLICATIONS

Qualcomm, Managing Background Data Traffic in Mobile Devices, Jan. 2012.*
(Continued)

*Primary Examiner* — Wing F Chan
*Assistant Examiner* — Billy H Ng
(74) *Attorney, Agent, or Firm* — Conley Rose, P.C.

(57) ABSTRACT

An application management method and a terminal, where the method includes acquiring a list of applications needing to retain background data in a terminal and suspending a first timer corresponding to a first application running in the terminal when the first application running in the terminal is not in the list of the applications needing to retain the background data. Further, timers of applications that do not need to retain background data in the terminal can be suspended. Because the timers stop to be run temporarily, the timers do not wake up the terminal from a dormant state, and correspondingly, the applications do not need to interact with a server end to update the background data, thereby reducing the number of times of waking up the terminal from a dormant state, saving electricity consumption and data traffic of the terminal.

20 Claims, 6 Drawing Sheets

Acquire a list of applications needing to retain background data in a terminal — 101

Suspend a timer of an application that is running when the application running in the terminal is not in the list of the applications needing to retain the background data — 102

Related U.S. Application Data continuation of application No. PCT/CN2012/076538, filed on Jun. 6, 2012.

(51) Int. Cl.
*G06F 9/46* (2006.01)
*G06F 9/48* (2006.01)
*G06F 1/32* (2006.01)

(52) U.S. Cl.
CPC ............ *G06F 9/485* (2013.01); *G06F 9/4825* (2013.01); *G06F 9/4893* (2013.01); *H04L 67/1095* (2013.01); *H04L 69/28* (2013.01); *H04L 69/16* (2013.01); *Y02D 10/24* (2018.01); *Y02D 30/40* (2018.01)

(58) Field of Classification Search
CPC .......... G06F 9/46; G06F 9/4825; G06F 9/485; G06F 9/4893; Y02B 60/144; Y02B 60/46
See application file for complete search history.

(56) References Cited

U.S. PATENT DOCUMENTS

| | | | |
|---|---|---|---|
| 2007/0083780 A1 | 4/2007 | Aoyagi et al. | |
| 2011/0185202 A1 | 7/2011 | Black et al. | |
| 2012/0023226 A1 | 1/2012 | Petersen et al. | |
| 2012/0094722 A1* | 4/2012 | Kim | H04W 52/0251 455/566 |
| 2012/0260118 A1* | 10/2012 | Jiang | G06F 9/4843 713/340 |
| 2012/0311578 A1* | 12/2012 | Hara | G06F 9/4445 718/1 |

FOREIGN PATENT DOCUMENTS

| | | |
|---|---|---|
| CN | 101772212 A | 7/2010 |
| CN | 102129287 A | 7/2011 |
| EP | 1014266 A2 | 6/2000 |
| EP | 1047239 A2 | 10/2000 |
| GB | 2476354 A | 6/2011 |
| JP | 2000132444 A | 5/2000 |
| JP | 2000307650 A | 11/2000 |
| JP | 2007102670 A | 4/2007 |
| WO | 2011066162 A1 | 6/2011 |

OTHER PUBLICATIONS

Machine Translation and Abstract of Chinese Publication No. CN101403981, Apr. 8, 2009, 9 pages.

Machine Translation and Abstract of Chinese Publication No. CN101488989, Jul. 22, 2009, 5 pages.

Machine Translation and Abstract of Chinese Publication No. CN101772212, Jul. 7, 2010, 8 pages.

Machine Translation and Abstract of Chinese Publication No. CN102129287, Jul. 20, 2011, 14 pages.

"Android Smartphone Master Book First Edition," Hashimoto Information Strategy Planning, Nikkei BP Koji Segawa, Feb. 13, 2012, 4 pages.

English Translation of "Android Smartphone Master Book First Edition," Hashimoto Information Strategy Planning, Nikkei BP Koji Segawa, Feb. 13, 2012, 7 pages.

Takei, T., et al., "Does the Battery Last on that Smartphone," Apr. 2, 2012, 4 pages.

Takei, T., et al., "Does the Battery Last on that Smartphone," Apr. 2, 2012, 11 pages.

Qualcomm, "Managing Background Data Traffic in Mobile Devices," Jan. 2012, 16 pages.

Microsoft, "Timer Class for .Net Framework 4.5," Retrieved from the Internet: URL: http://web.archive.org/web/20110927112359/http://msdn.microsoft.com/en-us/library/system.timers.timer(v=VS.110).aspx, Sep. 27, 2011, 8 pages.

Foreign Communication From a Counterpart Application, Japanese Application No. 2014-519383, Japanese Office Action dated Sep. 30, 2014, 3 pages.

Foreign Communication From a Counterpart Application, Japanese Application No. 2014-519383, English Translation of Japanese Office Action dated Sep. 30, 2014, 3 pages.

Foreign Communication From a Counterpart Application, European Application No. 12798583.6, Extended European Search Report dated Nov. 7, 2014, 9 pages.

Foreign Communication From a Counterpart Application, PCT Application No. PCT/CN2012/076538, English Translation of International Search Report dated Mar. 14, 2013, 2 pages.

Foreign Communication From a Counterpart Application, PCT Application No. PCT/CN2012/076538, English Translation of Written Opinion dated Mar. 14, 2013, 6 pages.

\* cited by examiner

APPLICATION MANAGEMENT METHOD AND TERMINAL

CROSS-REFERENCE TO RELATED APPLICATION

This application is a continuation of U.S. patent application Ser. No. 13/717,859, filed on Dec. 18, 2012, which is a continuation of International Application No. PCT/CN2012/076538, filed on Jun. 6, 2012. Both of the aforementioned patent applications are hereby incorporated by reference in their entireties.

TECHNICAL FIELD

The present disclosure relates to the field of communications technologies, and in particular, to an application management method and a terminal.

BACKGROUND

Intelligent terminals generally refer to terminal apparatuses having multimedia functions and strong data processing capabilities. The terminal apparatuses support implementation of data services. With the development of cloud services, data services in the intelligent terminals become increasingly richer. The data services include services initiated by various applications interacting with networks. When the application is running on a background of the intelligent terminal, data generated when the application interacts with a server end is called background data of the application. The application synchronizes, through data interaction, the background data thereof with data generated by the server end.

In other approaches, an intelligent terminal generally enters a dormant state when a display screen of the intelligent terminal is turned off. At this time, a timer may be set for the application if an application is still enabled in the intelligent terminal, in order to retain background data of the application. The intelligent terminal is triggered to wake up from the dormant state to synchronize the background data of the application with that of a server end when a time period of the timer arrives.

In the process of studying the other approaches, the inventor finds that, existing data services require continuous data interaction, which causes the increase of data traffic of a terminal. In particular, when the terminal enters the dormant state, because all applications need to perform data interaction with the server end according to time periods set by their respective timers in order to synchronize background data of all the applications with that of the server end, it is required to continuously wake up the terminal from the dormant state according to time periods set by different applications, thereby consuming the electricity quantity of the terminal and correspondingly shortening the standby time of the terminal.

SUMMARY

In embodiments of the present disclosure, an application management method and a terminal are provided, to solve the problem in the other approaches that all applications in a terminal need to perform periodical data interaction resulting in consumption of electricity quantity of the terminal.

In order to solve the foregoing technical problem, the embodiments of the present disclosure provide the following technical solutions.

An application management method includes acquiring a list of applications needing to retain background data in a terminal, and suspending a first timer corresponding to the first application running when a first application running in the terminal is not in the list of the applications needing to retain the background data, where the background data is data generated during data interaction between the applications and a server end when the applications are run on a background of the terminal, and the first timer is configured to trigger the first application to synchronize, through the data interaction, background data of the first application with data generated by the server end when a preset timed point of time arrives.

A terminal includes an acquisition unit configured to acquire a list of applications needing to retain background data, and a control unit configured to suspend a first timer corresponding to a first application running, when it is determined, according to the applications that need to retain the background data and are acquired by the acquisition unit, that the first application running in the terminal is not in the list of the applications needing to retain the background data, where the background data is data generated during data interaction between the applications and a server end when the applications are run on a background of the terminal, and the first timer is configured to trigger the first application to synchronize, through the data interaction, background data of the first application with data generated by the server end when a preset time arrives.

In the embodiments of the present disclosure, timers of applications that do not need to retain background data in a terminal can be suspended. Since the timers stop to be run temporarily, the terminal does not cause, due to timeout of the timers, the applications to perform data interaction with a server end to synchronize background data of the applications with data generated by the server end, thereby reducing the number of times of waking up the terminal from a dormant state, saving electricity consumption and data traffic of the terminal, and prolonging the standby time of the terminal correspondingly.

BRIEF DESCRIPTION OF THE DRAWINGS

To illustrate the technical solutions in the embodiments of the present disclosure more clearly, the following briefly describes the accompanying drawings required for describing the embodiments. The accompanying drawings in the following description merely show some embodiments of the present disclosure, and persons of ordinary skill in the art can derive other drawings from the accompanying drawings without creative efforts.

DETAILED DESCRIPTION

The following embodiments of the present disclosure provide an application management method and a terminal.

In order to make persons skilled in the art better understand technical solutions in the embodiments of the present disclosure and make the objectives, features, and advantages of the embodiments of the present disclosure clearer and more comprehensible, the technical solutions in the embodiments of the present disclosure are further described in detail in the following with reference to the accompanying drawings.

Figure 1:
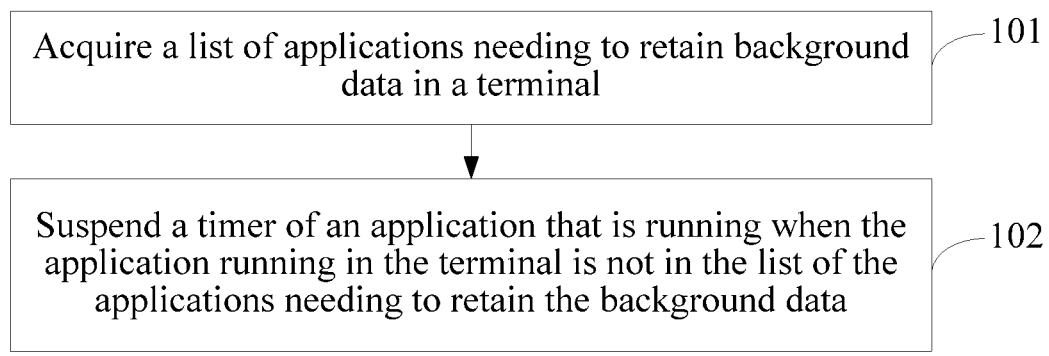
FIG. 1 is a flow chart of Embodiment 1 of an application management method of the present disclosure.

Referring to FIG. 1, FIG. 1 is a flow chart of Embodiment 1 of an application management method of the present disclosure.

Step 101: Acquire a list of applications needing to retain background data in a terminal.

In this embodiment, background data refers to data generated during data interaction between an application and a server end when the application is running on a background of the terminal. Generally, the application may obtain data generated by the server end from the server end, and take the data generated by the server end as background data of the application, to synchronize the background data of the application with the data generated by the server end when performing data interaction with the server end, or may also receive the data that is generated by the server end and is sent by the server end, and take the data generated by the server end as background data of the application, to synchronize the background data of the application with the data generated by the server end. The applications in this embodiment are applications needing to use a network. Therefore, the server end interacting with the applications may be any kind of an application server.

In order to ensure data synchronization between an application and a server end, a timer may be set for the application. The application is triggered to perform data synchronization with the server end, to keep background data of the application in consistence with data generated by the server end when a preset timed point for the timer arrives. For example, a certain application in a terminal is a weather forecast. Because the weather forecast is generally updated once every 24 hours, within one day, the application does not need to perform data interaction with a server end, that is, the application may be set to be an application that does not need to retain background data. For another example, a certain application in a terminal is GOOGLE electronic mail (GMAIL). Because GMAIL needs to receive a mail in real time after being enabled, the application may be set to be an application needing to retain background data. It should be noted that, if a user does not need to receive a mail in real time, GMAIL may also be set to be an application that does not need to retain background data.

Therefore, in this embodiment, a terminal user may select an application needing to retain background data in the terminal according to a requirement. The terminal may pre-search a list of applications in the terminal, and create a first list, where the first list is a list of applications needing to use a network, provide the first list to a user, and create and save a second list according to a result of performing, by the user, selection in the first list, where the second list is a list of applications needing to retain the background data. Information about whether the application needs a network is saved when each application is installed in the terminal. A list of applications needing to use the network is generated according to the saved information about whether each application needs a network when applications in the terminal are checked.

In this embodiment, the applications needing to retain background data in the terminal may be obtained by acquiring the saved second list. Alternatively, after receiving a command of turning off a display screen, the terminal may also provide a list of applications running in the terminal to the user, and acquire in real time the applications needing to retain background data, according to a result of performing, by the user, selection in the list.

Preferentially, in this embodiment, the applications needing to retain the background data in the terminal may be acquired when the display screen of the terminal is turned off.

Step 102: Suspend a timer of an application that is running when the application running in the terminal is not in the list of the applications needing to retain the background data.

In this embodiment, the timer of the application is configured to trigger the application corresponding to the timer to perform data interaction with a server end, to synchronize background data of the application with data generated by the server end when a preset timed point of time arrives.

Each application running in the terminal may be searched for. For each found application, it is determined whether the application is in the list of the applications needing to retain the background data. A timer corresponding to the application is suspended when the application is not in the list of the applications needing to retain the background data. At this time, the timer stops working. The foregoing process is repeated until all applications running in the terminal are completely searched for.

In this embodiment, the terminal may allocate a timer to each application. The timer has an identity identifier (ID). For example, an identity ID allocated to a timer of an application A is a, and an identity ID allocated to a timer of an application B is b. Suspending a timer refers to that the timer stops at a current timing point. At this time, the ID of the timer keeps unchanged, so subsequently, the suspended timer can be searched out according to the ID of the timer and the timer is activated to work such that the timer continues counting time for the same application.

It can be seen from the foregoing embodiment that, timers of applications that do not need to retain background data in a terminal can be suspended. Since the timers stop to be running temporarily, the terminal does not cause, due to timeout of the timers, the applications to perform data interaction with a server end to synchronize background data of the applications with data generated by the server end, thereby reducing the number of times of waking up the terminal from a dormant state, saving electricity consumption and data traffic of the terminal, and prolonging the standby time of the terminal correspondingly.

Figure 2:
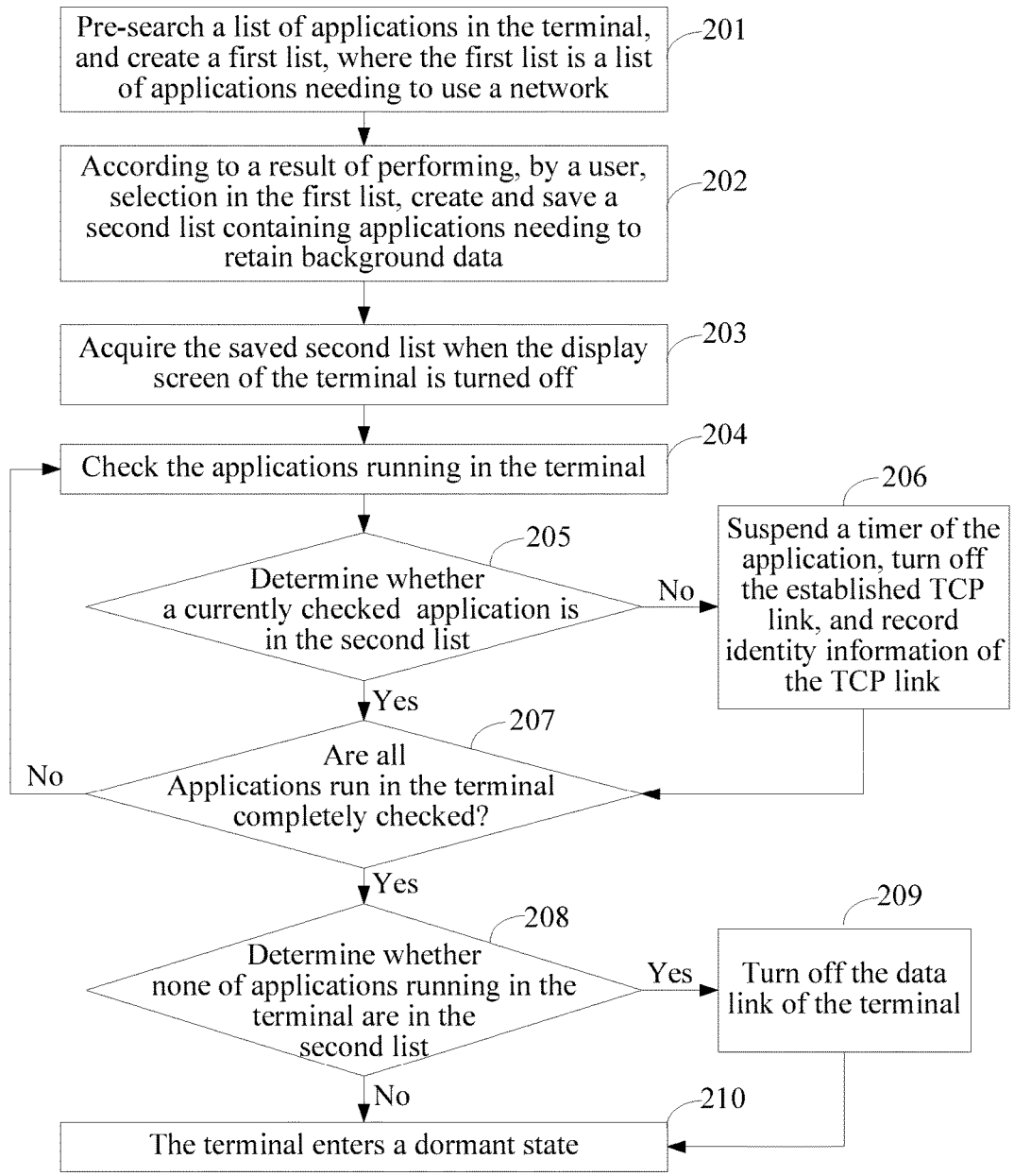
FIG. 2 is a flow chart of Embodiment 2 of an application management method of the present disclosure.

Referring to FIG. 2, FIG. 2 is a flow chart of Embodiment 2 of an application management method of the present disclosure. The embodiment illustrates a management process in the case that a terminal includes an application with a transmission control protocol (TCP) link established.

Step 201: Pre-search a list of applications in the terminal, and create a first list, where the first list is a list of applications needing to use a network.

In this embodiment, the list of applications needing to use the network in the terminal can be checked to create the first list of the applications needing to use the network when creating the first list by searching the list of applications. Information about whether the application needs a network is saved when each application is installed in the terminal. A list of applications needing to use the network is generated according to the saved information about whether each application needs a network when the applications in the terminal are checked.

Step 202: According to a result of performing, by a user, selection in the first list, create and save a second list containing applications needing to retain background data.

In this embodiment, background data refers to data generated during data interaction between an application and a server end when the application is running on a background of a terminal. Generally, an application may obtain data generated by the server end from the server end, and take the data generated by the server end as background data of the application, to synchronize the background data of the application with the data generated by the server end when performing data interaction with a server end, or may also receive the data that is generated by the server end and is sent by the server end, and take the data generated by the server end as background data of the application, to synchronize the background data of the application with the data generated by the server end. The applications in this embodiment are applications needing to use a network. Therefore, the server end interacting with the applications may be any kind of an application server.

After the terminal provides the created first list of the applications needing to use the network to the user, the user may create a second list by selecting an application needing to retain background data from the first list according to a requirement. For example, the user may select an application needing to retain background data from the first list in a checking manner. The terminal saves, according to a selection result of the user, the application needing to retain the background data in the second list. For example, the selection result may be saved in a flash memory in a form of the second list such that subsequently, the saved second list can be retrieved from the flash to determine whether an application that is running needs to retain background data when a display screen is turned off.

It should be noted that, this embodiment illustrates saving, through a list, an application needing to retain background data, and in practice, an application that does not need to retain background data may also be saved through a list, which is not limited in the embodiment of the present application, as long as the terminal can determine, according to information saved in the list, whether each application that is running needs to retain background data.

In addition, apart from the method for acquiring an application needing to retain background data in the terminal shown in step 201 and step 202 in this embodiment, after receiving a command of turning off a display screen, the terminal may also provide a list of applications running in the terminal to the user, and acquire in real time an application needing to retain background data according to a result of performing, by the user, selection in the list.

Step 203: Acquire the saved second list when the display screen of the terminal is turned off.

In this embodiment, the terminal may acquire, according to the second list saved in step 202, an application needing to retain background data when the display screen of the terminal is turned off.

Step 204: Check the applications running in the terminal.

Before the display screen of the terminal is turned off, several applications are running in the terminal. At this time, a checking method may be used to determine in a one-by-one manner whether the application that is running needs to retain background data.

Step 205: Determine whether an application currently checked is in the second list, perform step 207 if the application currently checked is in the second list, and otherwise, perform step 206.

Step 206: Suspend a timer of the application, turn off the established TCP link, and record identity information of the TCP link.

In this embodiment, the timer of the application is configured to, trigger the application corresponding to the timer to perform data interaction with the server end in order to synchronize background data of the application with data generated by the server end when a preset timed point of time arrives. The terminal may allocate a timer to each application. The timer has an identity ID. For example, an identity ID allocated to a timer of an application A is a and an identity ID allocated to a timer of an application B is b. Suspending a timer refers to that the timer stops at a current timing point of time. At this time, the ID of the timer keeps unchanged, so subsequently, the suspended timer can be searched out according to the ID of the timer, and the timer is activated to work such that the timer continues counting time for the same application.

It should be noted that, in practice, an application in the terminal may implement a data service based on user datagram protocol (UDP) or implement a data service based on the TCP, where for the data service based on the TCP, a TCP link needs to be established between a terminal and a server, and for the data service based on the UDP, a dedicated network connection does not need to be established because data is transmitted using a broadcast manner. Therefore, for an application that does not need to retain background data, it is only needed to suspend a timer of the application if a TCP link is not established for the application.

In this embodiment, it is assumed that all application that is running need to establish TCP links. Therefore, when an application that is running that is currently checked does not belong to the applications needing to retain background data, a timer set for the application is suspended, thereby reducing the number of times of waking up the terminal from a dormant state when a period of the timer arrives, and at the same time, the TCP link established by the application is disconnected and identity information of the TCP link is recorded such that the corresponding TCP link can be subsequently restored according to the identity information.

Step 207: Determine whether all applications running in the terminal are completely checked, perform step 208 if all the applications running in the terminal are completely checked, and otherwise, return to step 204.

Step 208: Determine whether none of applications running in the terminal are in the second list, perform step 209 if none of applications running in the terminal are in the second list, and otherwise, perform step 210.

When at least one application needing to retain background data exits among all applications running in the terminal, the terminal still needs to maintain a data link established with the server end in order to support the terminal to implement data interaction through the data link. When all applications running in the terminal are applications that do not need to retain background data, the established data link can be turned off in order to further reduce energy consumed when the terminal maintains the data link.

Step 209: Turn off the data link of the terminal.

Step 210: The terminal enters a dormant state, and the current flow is ended.

It can be seen from the foregoing embodiment that, in the embodiment of the present disclosure, when a display screen of a terminal is turned off, timers of applications that do not need to retain background data in the terminal are suspended, and the timers stop to run temporarily, so the terminal does not cause, due to timeout of the timers, the applications to perform data interaction with a server end, thereby reducing the number of times of waking up the terminal from a dormant state, saving electricity consumption and data traffic of the terminal, and prolonging the standby time of the terminal correspondingly. In addition, when all applications running in the terminal are applications that do not need to retain background data, the established data link can be turned off, thereby further reducing energy consumed when the terminal maintains the data link.

Figure 3:
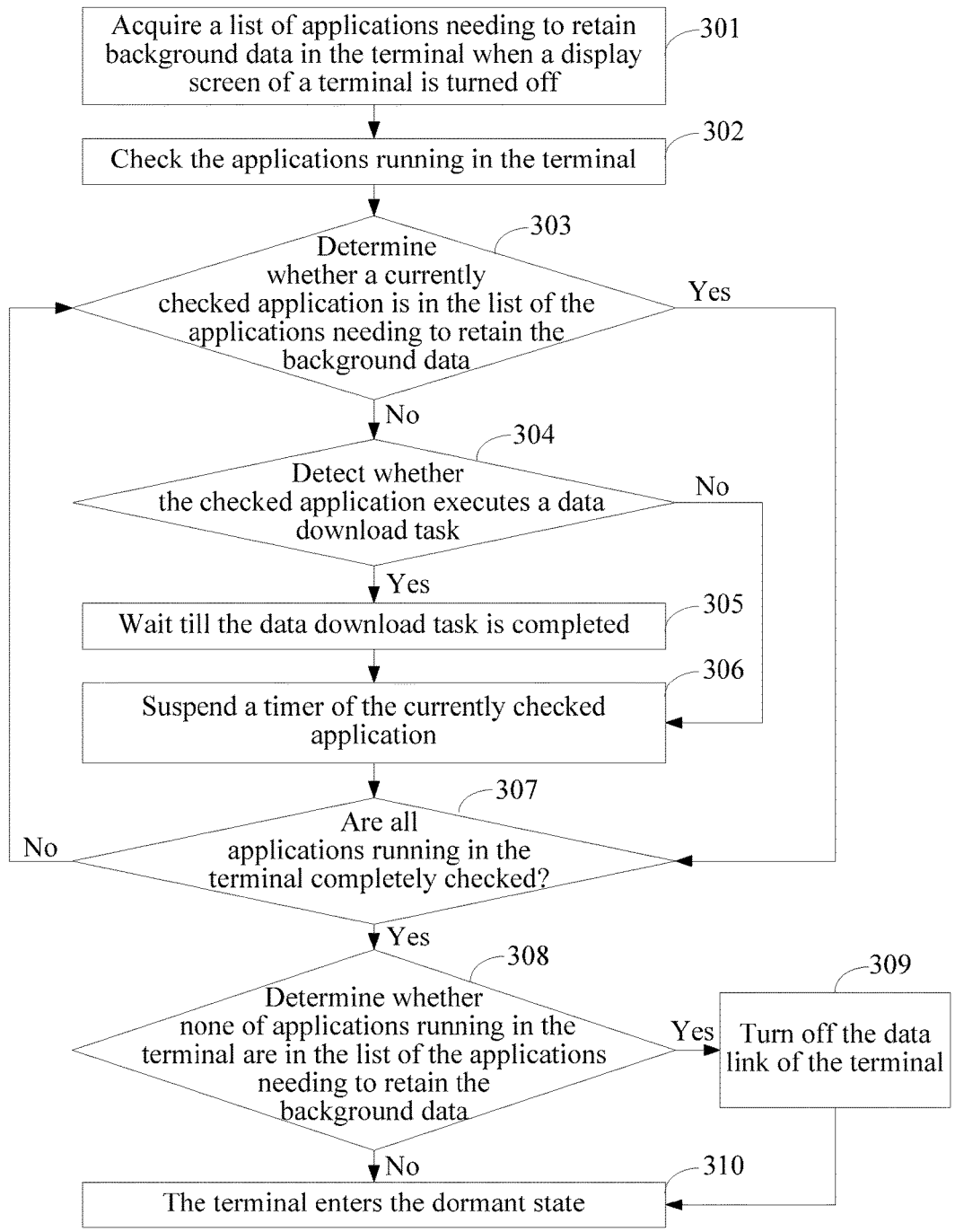
FIG. 3 is a flow chart of Embodiment 3 of an application management method of the present disclosure.

Referring to FIG. 3, FIG. 3 is a flow chart of Embodiment 3 of an application management method of the present disclosure. The embodiment illustrates a management process in the case that an application that does not need to retain background data is an application for executing a download task.

Step 301 Acquire a list of applications needing to retain background data in the terminal when a display screen of a terminal is turned off.

In this embodiment, background data refers to data generated during data interaction between an application and a server end when the application is running on a background of a terminal. Generally, when performing data interaction with a server end, an application may obtain data generated by the server end from the server end, and take the data generated by the server end as background data of the application, to synchronize the background data of the application with the data generated by the server end, or may also receive the data that is generated by the server end and is sent by the server end, and take the data generated by the server end as background data of the application, to synchronize the background data of the application with the data generated by the server end. The applications in this embodiment are applications needing to use a network. Therefore, the server end interacting with the applications may be any kind of an application server.

The terminal enters a dormant state when the display screen of the terminal is turned off. At this time, in order to ensure data synchronization between an application and a server end, a timer may be set for the application. The terminal is awakened from the dormant state to enable the application to perform data interaction with the server end in order to keep background data of the application in consistence with data of the server end when a time period of the timer arrives. For example, a certain application in a terminal is a weather forecast. Because the weather forecast is generally updated once every 24 hours, and an interval between turning off the display screen of the terminal and turning on the display screen of the terminal again by a user is generally less than 24 hours, the application does not need to perform data interaction with a server end, that is, the application may be set to be an application that does not need to retain background data when the terminal enters the dormant state. For another example, a certain application in a terminal is GMAIL. Because GMAIL needs to receive a mail in real time after being enabled, the application still needs to perform data interaction with a server end, that is, the application may be set to be an application needing to retain background data when the terminal enters the dormant state. It should be noted that, GMAIL may also be set to be an application that does not need to retain background data if a user does not need to receive a mail in a situation that the display screen is turned off.

Therefore, in this embodiment, a terminal user may select an application needing to retain background data in the terminal according to a requirement. The terminal may pre-search a list of applications in the terminal, and create a first list, where the first list is a list of applications needing to use a network, provide the first list to a user, and create and save a second list according to a result of performing, by the user, selection in the first list, where the second list is a list of applications needing to retain the background data. Information about whether the application needs a network is saved when each application is installed in the terminal. A list of applications needing to use the network is generated according to the saved information about whether each application needs a network when applications in the terminal are checked.

In this embodiment, a list of applications needing to retain background data in the terminal may be obtained by acquiring the saved second list. Alternatively, after receiving a command of turning off a display screen, the terminal may also provide a list of applications running in the terminal to the user, and acquire in real time a list of applications needing to retain background data, according to a result of performing, by the user, selection in the list.

Step 302: Check the applications running in the terminal.

Before the display screen of the terminal is turned off, several applications are running in the terminal. At this time, a checking method may be used to determine in a one-by-one manner whether the application that is running needs to retain background data.

Step 303: Determine whether an application currently checked is in the list of applications needing to retain background data, perform step 307 if the application currently checked is in the list, and otherwise, perform step 304.

Step 304: Detect whether the checked application executes a data download task, perform step 305 if the checked application executes the data download task, and otherwise, perform step 306.

Generally a timer of an application is suspended if the application that is running that is currently checked is not in the list of applications needing to retain background data. However, a data service of the application may be interrupted due to the suspending of the timer of the application if the application is executing a data download task. Therefore, in order to ensure normal execution of the data service, in this embodiment, it is further detected whether the application that is running executes a data download task.

Step 305: Wait till the data download task is completed.

If an application that is running that is currently checked is not in the list of applications needing to retain background data and the application is executing a data download task, the terminal waits till the data download task is completed, and then performs subsequent step 306.

Step 306: Suspend a timer of the currently checked application.

In this embodiment, the terminal may allocate a timer to each application. The timer has an identity ID. Suspending a timer refers to that the timer stops at a current timing point of time. At this time, the ID of the timer keeps unchanged. Therefore, subsequently, the suspended timer can be searched out according to the ID of the timer and the timer is activated to work such that the timer continues counting time for the same application.

In this embodiment, it is assumed that no application that is running establish TCP links. Therefore, it only needs to suspend a timer set for an application when the application that is running that is currently checked does not belong to the applications needing to retain background data. However, in practice, for an application with a TCP link established, reference may be made to the description in the embodiment shown in FIG. 2. After the timer set for the application is suspended, it further needs to turn off the established TCP link and record identity information of the TCP link, which is not detailed here again.

Step 307: Whether all applications running in the terminal are completely checked, if all applications running in the terminal are completely checked perform step 308, and otherwise, return to step 302.

Step 308: Determine whether none of applications running in the terminal are in the list of the applications needing to retain background data, perform step 309 if none of applications running in the terminal are in the list of the applications needing to retain background data, and otherwise, perform step 310.

The terminal still needs to maintain the established data link in order to support the terminal to implement data interaction through the data link when at least one application needing to use a network exits among all applications running in the terminal. The established data link can be turned off in order to further reduce energy consumed when the terminal maintains the data link when all applications running in the terminal are applications that do not need to use the network.

Step 309: Turn off the data link of the terminal.

Step 310: The terminal enters the dormant state, and the current flow is ended.

It can be seen from the foregoing embodiment that, in the embodiment of the present disclosure, when a display screen of a terminal is turned off, timers of applications that do not need to retain background data in the terminal are suspended, and the timers stop to be run temporarily, thereby reducing the number of times of waking up the terminal from a dormant state when a time period arrives, saving electricity consumption and data traffic of the terminal, and prolonging the standby time of the terminal correspondingly. In addition, in this embodiment, before a timer of an application is turned off, it is detected whether the application executes a data download task such that the terminal turns off the timer after the data download is completed, thereby ensuring normal execution of a data service.

Figure 4:
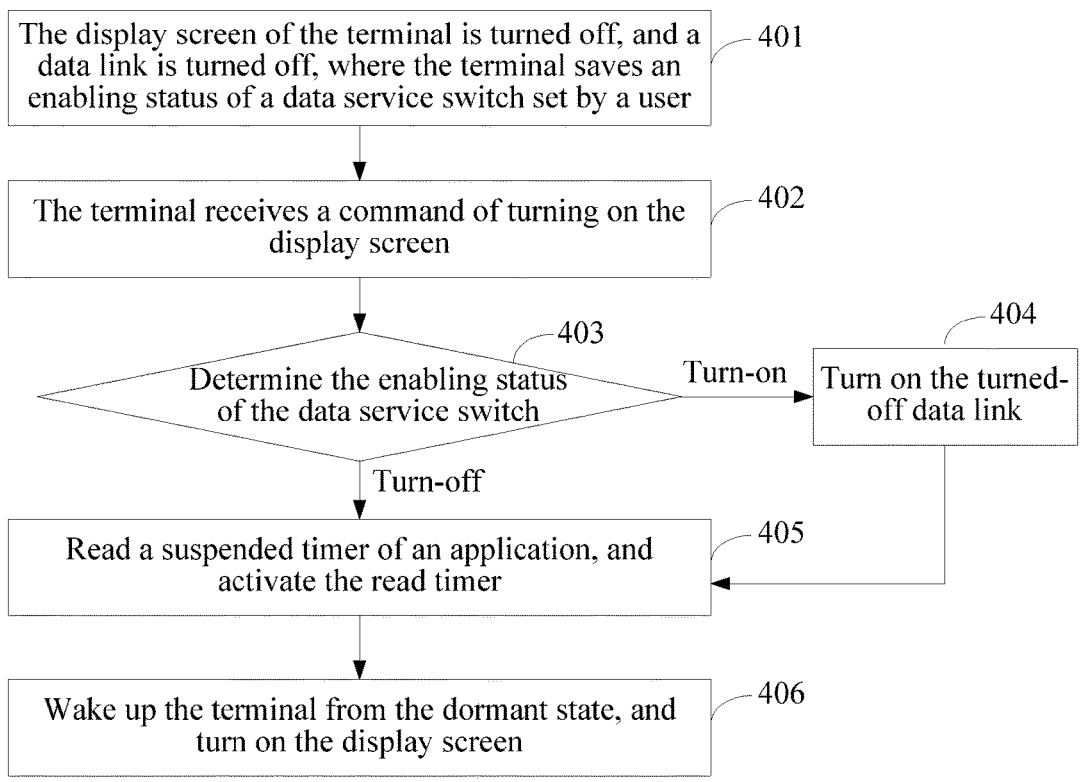
FIG. 4 is a flow chart of Embodiment 4 of an application management method of the present disclosure.

Referring to FIG. 4, FIG. 4 is a flow chart of Embodiment 4 of an application management method of the present disclosure. The embodiment illustrates an application management process in the case that a display screen of a terminal is turned on from a turn-off state.

Step 401: Turn off the display screen of the terminal, and turn off a data link, where the terminal saves an enabling status of a data service switch set by a user.

Generally, the terminal has functions of executing voice services and data services. In the embodiment of the present disclosure, the running of applications belongs to a part of the data services. The data service switch may be preset on the terminal. The data service switch may be provided, in an option form, for a user to select. The user may select to set the enabling status of the data service switch according to a requirement. If the enabling status is turn-on, it indicates that the user needs to implement a data service on the terminal. If the enabling status is turn-off, it indicates that the user does not need to implement a data service on the terminal. When the enabling status of the data service switch is turn-off, it needs to keep a data link in the terminal turned off in order to ensure that the terminal cannot implement a data service according to the data link.

Step 402: The terminal receives a command of turning on the display screen.

This embodiment may be performed after any one of foregoing Embodiment 2 and Embodiment 3 of the method, that is, the foregoing embodiments describe that the terminal turns off the display screen and enters a dormant state, and this embodiment describes a process of managing an application after the terminal receives the command of turning on the display screen.

Step 403: Determine the enabling status of the data service switch, perform step 404 if the enabling status is turn-on, and perform step 405 if the enabling status is turn-off.

When the enabling status of the data service switch is turn-on, it indicates that the terminal needs to implement a data service, perform step 404 to turn on a turned-off data link. When the enabling status of the data service switch is turn-off, it indicates that the terminal does not need to implement a data service, so it only needs to keep the data link turned off.

Step 404: Turn on the turned-off data link.

Step 405: Read a suspended timer of an application, and activate the read timer.

When suspending the timer of the application, the terminal may save a list containing identity IDs of the timers, and by reading the identity IDs in the list, the terminal may acquire a timer needing to be activated. For a suspended timer, the time difference between a point of time at which the timer stops when the display screen is turned off and a current point of time may be acquired. It is determined, according to the time difference, whether the timer exceeds a preset timing length. The timer is activated to start to count time again when the preset timing length is exceeded. The timer is activated to continue counting time from the current point of time when the preset timing length is not exceeded.

When the enabling status of the data service switch is turn-on, it indicates that the user sets that the terminal needs to implement a data service, after receiving the command of turning on the display screen, the terminal turns on the turned-off data link. At this time, the timer is activated to start to count time. An application corresponding to the timer may perform data interaction with a server end through the turned-on data link in order to synchronize background data of the application with data generated by the server end when the preset timing length arrives.

When the enabling status of the data service switch is turn-off, it indicates that the user sets that the terminal does not need to implement a data service, after receiving the command of turning on the display screen, the terminal still keeps the data link turned off such that the application cannot perform data interaction with the server end through the data link, that is, cannot implement the data service. At this time, the timer can still be activated to start to count time, because for an application, when the preset timing length of the timer is reached, apart from the triggering the application to perform data interaction with the server end through the data link involved in the embodiment of the present disclosure, the application may also be triggered to execute some operations without the need of connecting to the network in the terminal, for example, updating a time of an application interface. Therefore, in this embodiment, by activating a timer, it can be ensured that the application performs an operation normally in the terminal. After the user sets that the enabling status of the data service switch is turn-on and the data link is turned on subsequently, the application corresponding to the timer can continue performing data interaction with the server end according to the timing of the timer in order to synchronize background data of the application with data generated by the server end. It should be noted that, in this embodiment, the suspended timer may not be activated temporarily when the enabling status of the service switch is turn-off, and after the user sets that the enabling status of the service switch is turn-on and the data link is turned on subsequently, the suspended timer is read and activated, which is not limited in the embodiment of the present disclosure.

Step 406: Wake up the terminal from the dormant state, turn on the display screen, and end the current flow.

It can be seen from the foregoing embodiment that, the embodiment corresponds to the foregoing embodiment of the method for controlling a data service after the terminal turns off the display screen. After the terminal receives the command of turning on the display screen, when the enabling status of the data service switch is turn-on, the data link is turned on, and then the terminal can be waken up from the dormant state by activating timers such that applications corresponding to the activated timers can perform data interaction with a server, thereby enabling the terminal to enter a conventional data service process.

Corresponding to the embodiments of the application management method of the present disclosure, the present disclosure further provides embodiments of a terminal for executing the embodiments of the method.

Figure 5:
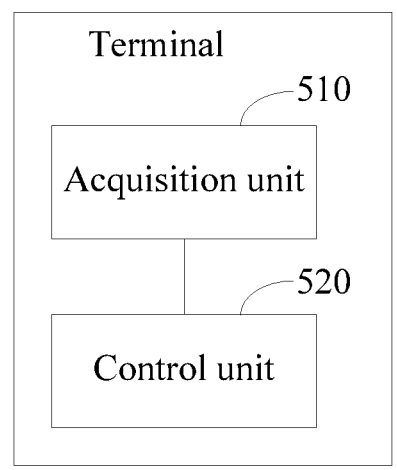
FIG. 5 is a block diagram of Embodiment 1 of a terminal of the present disclosure.

Referring to FIG. 5, FIG. 5 is a block diagram of Embodiment 1 of a terminal of the present disclosure.

The terminal includes an acquisition unit 510 and a control unit 520.

The acquisition unit 510 is configured to acquire a list of applications needing to retain background data.

The control unit 520 is configured to suspend a first timer corresponding to the first application running when it is determined, according to the applications needing to retain background data acquired by the acquisition unit 510, that a first application running in the terminal is not in the list of applications needing to retain background data, where the background data is data generated during data interaction between the applications and a server end when the applications are running on a background of the terminal, and the first timer is configured to trigger the first application to synchronize, through the data interaction, background data of the first application with data generated by the server end when a preset timed point of time arrives.

Figure 6A:
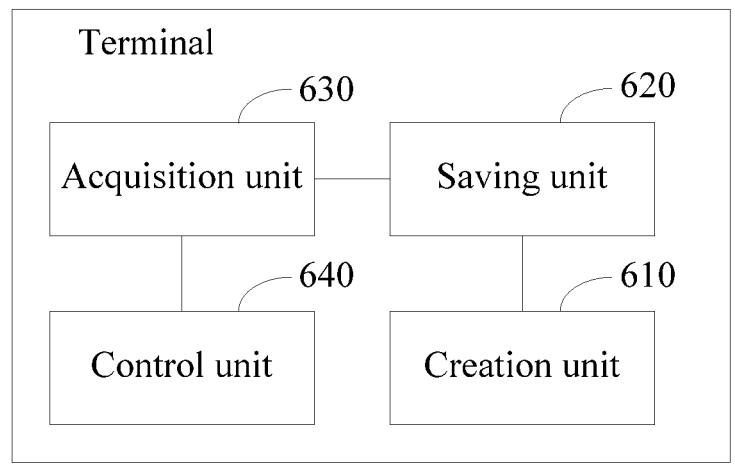
FIG. 6A is a block diagram of Embodiment 2 of a terminal of the present disclosure.

Referring to FIG. 6A, FIG. 6A is a block diagram of Embodiment 2 of a terminal of the present disclosure.

The terminal includes a creation unit 610, a saving unit 620, an acquisition unit 630, and a control unit 640.

The creation unit 610 is configured to pre-search a list of applications in the terminal, and create a first list, where the first list is a list of applications needing to use a network.

The saving unit 620 is configured to create and save a second list, according to a result of performing, by a user, selection in the first list created by the creation unit 610, where the second list is a list of applications needing to retain background data.

The acquisition unit 630 is configured to acquire the second list saved by the saving unit 620 when a display screen of the terminal is turned off.

The control unit 640 is configured to suspend a first timer corresponding to the first application running when it is determined, according to the second list acquired by the acquisition unit 630, that the first application running in the terminal is not in the second list, where the background data is data generated during data interaction between the applications and a server end when the applications are running on a background of the terminal, and the first timer is configured to trigger the first application to synchronize, when a preset timed point of time arrives, through the data interaction, background data of the first application with data generated by the server end.

Further, the control unit 640 is further configured to turn off a data link of the terminal when none of applications running in the terminal are in the applications needing to retain the background data acquired by the acquisition unit 630.

Further, after suspending timers of the applications that are running, if the first application already establishes a TCP link, the control unit 640 is further configured to turn off the established TCP link and record identity information of the TCP link, where the identity information is used to restore the TCP link of the first application according to the identity information after the first timer is activated.

Further, the control unit 640 is further configured to trigger the suspending the timers of the applications that are running if it is detected that the first application running executes a data download task, after the data download task is completed.

Further, the control unit 640 is further configured to save an enabling status of a data service switch in the terminal when the data link is turned off, where the enabling status is set by a user, and turn on the data link if the enabling status of the data service switch is turn-on, and keep the data link turned off if the enabling status of the data service switch is turn-off when the display screen of the terminal enters a turn-on state from a turn-off state.

Further, the control unit 640 is further configured to read suspended timers of the applications, and re-activate the timers when the display screen of the terminal enters the turn-on state from the turn-off state.

In this embodiment, the control unit 640 may activate the read timers of the applications when the enabling status of the data service switch is turn-off and the data link is kept turned off in order to ensure normal execution of the applications in the terminal through the timing of the timers. Alternatively, the control unit 640 does not activate the suspended timers temporarily when the enabling status of the service switch is turn-off, and after the user sets that the enabling status of the service switch is turn-on and the data link is turned on subsequently, the control unit 640 reads the suspended timers and activates the timers, which is not limited in the embodiment of the present disclosure. For detailed description, reference may be made to the description in step 405 in the embodiments of the method.

Figure 6B:
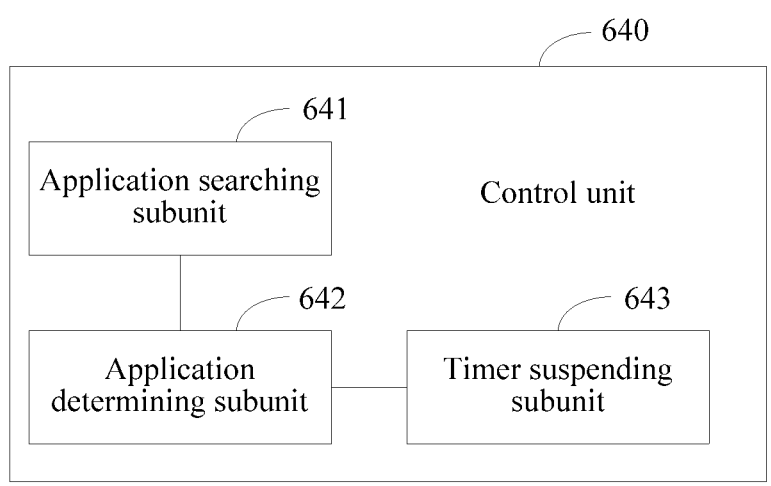
FIG. 6B is a block diagram of an embodiment of a control unit in FIG. 6A.

Referring to FIG. 6B, FIG. 6B is a block diagram of an embodiment of a control unit in FIG. 6A.

The control unit 640 may include the following subunits.

An application searching subunit 641 is configured to search out the first application running in the terminal.

An application determining subunit 642 is configured to determine whether the first application searched out by the application searching subunit 641 is in the list of applications needing to retain background data acquired by the acquisition unit 630.

A timer suspending subunit 643 is configured to suspend the first timer corresponding to the first application when the application determining subunit 642 determines that the first application is not in the list of applications needing to retain background data.

It can be seen from the foregoing embodiment that, timers of applications that do not need to retain background data in a terminal can be suspended. The timers stop to run temporarily, so the terminal does not cause, due to timeout of the timers, the applications to perform data interaction with a server end to synchronize background data of the applications with data generated by the server end, thereby reducing the number of times of waking up the terminal from a dormant state, saving electricity consumption and data traffic of the terminal, and prolonging the standby time of the terminal correspondingly.

Persons skilled in the art may understand clearly that, the technique of the embodiments of the present disclosure may be implemented through software plus a necessary general hardware platform. Based on such understanding, the technical solutions in the embodiments of the present disclosure substantially or the part that makes contributions to the prior art can be embodied in the form of a software product. The computer software product may be stored in a storage medium such as an read-only memory (ROM), random-access memory (RAM), a magnetic disk, or an optical disk, and contains several instructions to instruct a computer equipment (e.g., a personal computer, a server, or network equipment) to perform the methods described in the embodiments of the present disclosure or in some parts of the embodiments of the present disclosure.

In this specification, each embodiment is described in a progressive way, for the same or similar parts in each embodiment, reference may be made to each other. What are focused in each embodiment are contents that are different from the other embodiments. In particular, the embodiments of a system are basically similar to the embodiments of the method, so the embodiments of the system are described simply, where for the relevant contents, reference may be made to description of the embodiments of the method.

Embodiments of the present disclosure described in the foregoing are not intended to limit the protection scope of the present disclosure. Any modifications, equivalent substitutions and improvements made within the idea and principle of the present disclosure should fall within the protection scope of the present disclosure.

What is claimed is:

1. An application management method, comprising:
   receiving, by a terminal, an indication to turn off a display screen of the terminal, wherein an application is running in the terminal when the indication is received;
   determining, by the terminal, whether the application needs to retain background data after the terminal enters a dormant state when the terminal turns off the display screen; and
   suspending a timer associated with the application after the terminal enters the dormant state when the application does not need to retain the background data, wherein the timer is used to wake up the terminal when the application needs to retain background data after the terminal enters the dormant state.

2. The method according to claim 1, further comprising waking up the terminal based on the timer associated with the application when the application needs to retain the background data after the terminal enters the dormant state.

3. The method according to claim 1, wherein there is a plurality of applications installed in the terminal, and wherein whether the application needs to retain the background data after the terminal enters the dormant state is preset by a user of the terminal.

4. The method according to claim 1, further comprising:
   turning off an established transmission control protocol (TCP) link of the application; and
   recording identity information of the TCP link, wherein the identity information of the TCP link is used to restore the TCP link of the application after the terminal is woken up.

5. The method according to claim 1, wherein suspending the timer associated with the application is performed after the application completes a data download task.

6. The method according to claim 1, further comprising turning off a data link of the terminal when there is no application running in the terminal that needs to retain the background data.

7. The method according to claim 6, further comprising:
   saving an enabling status of a data service switch in the terminal when the data link is turned off, wherein the enabling status is preset by a user of the terminal;
   turning on the data link when the display screen of the terminal enters a turn-on state from a turn-off state and the enabling status of the data service switch is turn-on; and
   keeping the data link turned off when the display screen of the terminal enters the turn-on state from the turn-off state and the enabling status of the data service switch is turn-off.

8. The method according to claim 1, wherein the terminal exits the dormant state when the display screen of the terminal enters a turn-on state from a turn-off state.

9. The method according to claim 8, further comprising activating the timer associated with the application when the terminal exits the dormant state.

10. A computer program product, comprising program codes stored in a non-transitory computer readable storage medium for use by a terminal for application management, wherein the program codes comprise instructions for:
   receiving an indication to turn off a display screen of the terminal, wherein an application is running in the terminal when the indication is received;
   determining whether the application needs to retain background data after the terminal enters a dormant state when the terminal turns off the display screen; and
   suspending a timer associated with the application after the terminal enters the dormant state when the application does not need to retain the background data, wherein the timer is used to wake up the terminal when the application needs to retain the background data after the terminal enters the dormant state.

11. The computer program product according to claim 10, further comprising instructions for waking up the terminal based on the timer associated with the application when the application needs to retain the background data after the terminal enters the dormant state.

12. The computer program product according to claim 10, wherein there is a plurality of applications installed in the terminal, and wherein whether the application needs to retain the background data after the terminal enters the dormant state is preset by a user of the terminal.

13. A terminal device, comprising:
   at least one processor configured to execute one or more applications; and
   a non-transitory computer readable medium coupled to the at least one processor and configured to store program codes, wherein when executed by the processor, cause the processor to:
     receive an indication to turn off a display screen of the terminal device, wherein an application is running in the terminal device when the indication is received;
     determine whether the application needs to retain background data after the terminal device enters a dormant state when the terminal device turns off the display screen; and
     suspend a timer associated with the application after the terminal device enters the dormant state when the application does not need to retain the background data, wherein the timer is used to wake up the terminal when the application needs to retain background data after the terminal enters the dormant state.

14. The terminal device according to claim 13, wherein the program codes further cause the processor to wake up the terminal device based on the timer associated with the application when the application needs to retain the background data after the terminal device enters the dormant state.

15. The terminal device according to claim 13, further comprising a memory, wherein whether the application needs to retain the background data after the terminal device enters a dormant state is preset by a user of the terminal device.

16. The terminal device according to claim 13, wherein the program codes further cause the processor to:
 turn off an established transmission control protocol (TCP) link of the application; and
 record identity information of the TCP link, wherein the identity information of the TCP link is used to restore the TCP link of the application after the terminal is woken up.

17. The terminal device according to claim 13, wherein suspending the timer associated with the application is performed after the application completes a data download task.

18. The terminal device according to claim 13, wherein the program codes further cause the processor to turn off a data link of the terminal device when there is no application running in the terminal device that needs to retain the background data.

19. The terminal device according to claim 18, further comprising a memory, wherein the program codes further cause the processor to:
 save an enabling status of a data service switch in the memory when the data link is turned off, wherein the enabling status is preset by a user of the terminal device;
 turn on the data link when the display screen of the terminal device enters a turn-on state from a turn-off state and the enabling status of the data service switch is turn-on; and
 keep the data link turned off when the display screen of the terminal device enters the turn-on state from the turn-off state and the enabling status of the data service switch is turn-off.

20. The terminal device according to claim 13, wherein the terminal device exits the dormant state when the display screen enters a turn-on state from a turn-off state.

* * * * *